United States Patent [19]

Satoh et al.

[11] 4,170,790
[45] Oct. 9, 1979

[54] TAPE RECORDER DEVICE WITH TAPE RUNNING SPEED DISPLAY

[75] Inventors: Ken Satoh, Hachioji; Yoshio Tomizawa, Tama, both of Japan

[73] Assignee: Olympus Optical Co., Ltd., Tokyo, Japan

[21] Appl. No.: 855,559

[22] Filed: Nov. 29, 1977

[30] Foreign Application Priority Data

Nov. 30, 1976 [JP] Japan .............................. 51-143582
Nov. 30, 1976 [JP] Japan .............................. 51-143583

[51] Int. Cl.² .................... G06F 15/02; G11B 1/04
[52] U.S. Cl. ................................ 364/705; 324/172; 360/31; 360/137
[58] Field of Search ............... 364/565, 705; 360/6, 360/31, 73, 137; 116/114 R, 115; 340/259, 260; 324/160, 161, 172

[56] References Cited

U.S. PATENT DOCUMENTS 3,511,151  5/1970  Hillman .............................. 360/31 X
3,673,351  6/1972  Niioka et al. ..................... 340/259 X

FOREIGN PATENT DOCUMENTS 2340373  2/1975  Fed. Rep. of Germany ........... 364/705

Primary Examiner—Jerry Smith

[57] ABSTRACT

Rotational speed of a flywheel directly coupled with a capstan is detected by a speed detector. The rotational speed data and the reference speed data are supplied to a comparator/arithmetic circuit whereby actual tape running speed relative to the reference speed is calculated. Data outputted from the comparator/arithmetic circuit is supplied to a display device whereby relative value of the actual tape speed with reference to the reference speed is displayed.

11 Claims, 7 Drawing Figures

FIG. 4
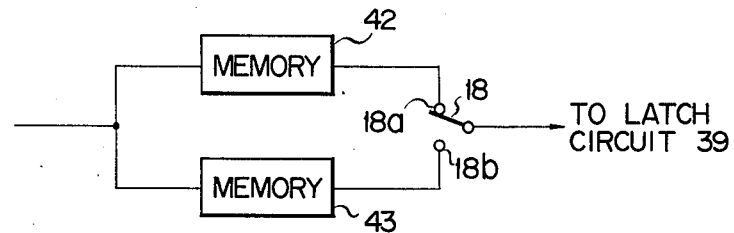
FIG. 5
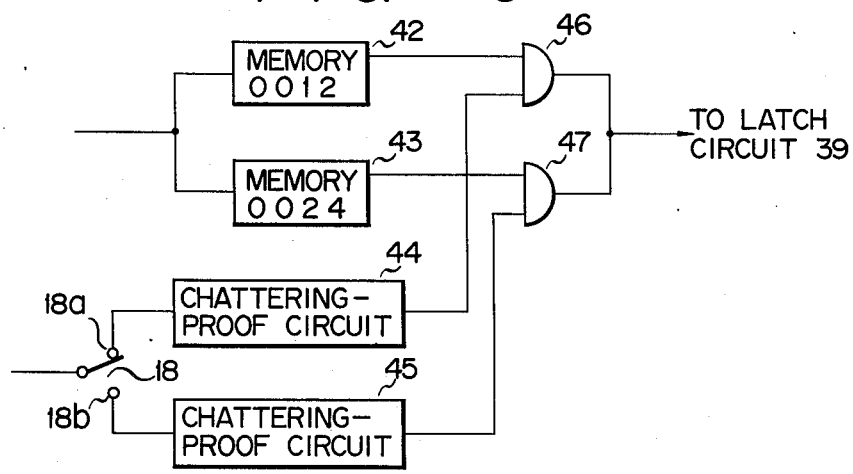
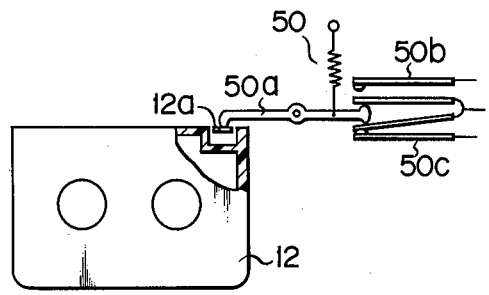
FIG. 6A
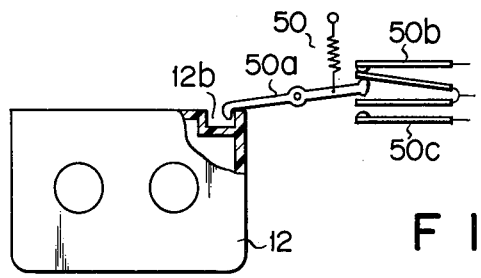
FIG. 6B

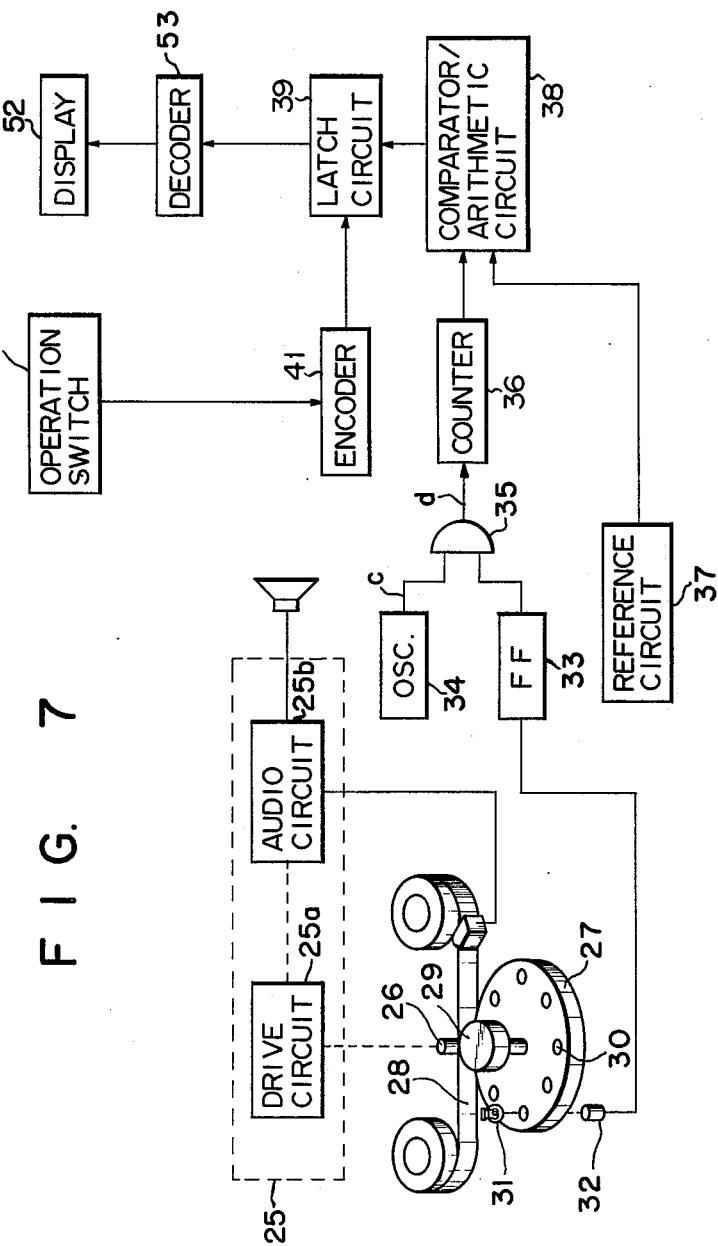

TAPE RECORDER DEVICE WITH TAPE RUNNING SPEED DISPLAY

BACKGROUND OF THE INVENTION

The present invention relates to a tape recorder device capable of displaying tape running speed and, more particularly, a portable type tape recorder for digitally displaying tape running speed.

Recent remarkable advancement of IC and LSI technologies enables most part of an electric circuit to be miniaturized. A number of electric apparatuses with various functions by using such miniaturized circuits have been developed and on the market. For example, German patent disclosure gazette No. 2340373 discloses a tape recorder with desk top calculator. However, the tape recorder in this specification is not provided with display or indicating means for displaying the operation condition of the tape recorder, for example, tape running speed. For this, one feels somewhat inconvenienced when using it. Particularly, for tape recorders of the type in which the tape speed is freely changed, it is preferable that the tape running speed is monitored. Tape recorders provided with display devices capable of displaying the tape running speed are known, most of the display device are of mechanical design.

SUMMARY OF THE INVENTION

Accordingly, an object of the present invention is to provide a tape recorder device which is capable of electrically displaying the tape running speed of the tape recorder.

According to the present invention, there is provided an improved tape recorder device in which a tape running speed is detected by a speed detector, the detected tape speed data and a reference speed data are compared in a comparison/arithmetic circuit, and the comparison/arithmetic circuit produces a relative value of actual tape speed to the reference speed, and the relative value is displayed by a display device.

BRIEF DESCRIPTION OF THE DRAWINGS

The present invention will be better understood from the following description taken in connection with the accompanying drawings, in which:

FIG. 4 is a circuit diagram for generating predetermined running speed data of tape;

FIG. 5 is a circuit diagram of a modification of the predetermined speed data generating circuit;

FIGS. 6A and 6B show a mechanism of a switch for switching the predetermined speeds from one to another; and FIG. 7 shows a block diagram of another embodiment of the tape recorder according to the present invention.

DETAILED DESCRIPTION OF THE PREFERRED EMBODIMENT

Figure 1:
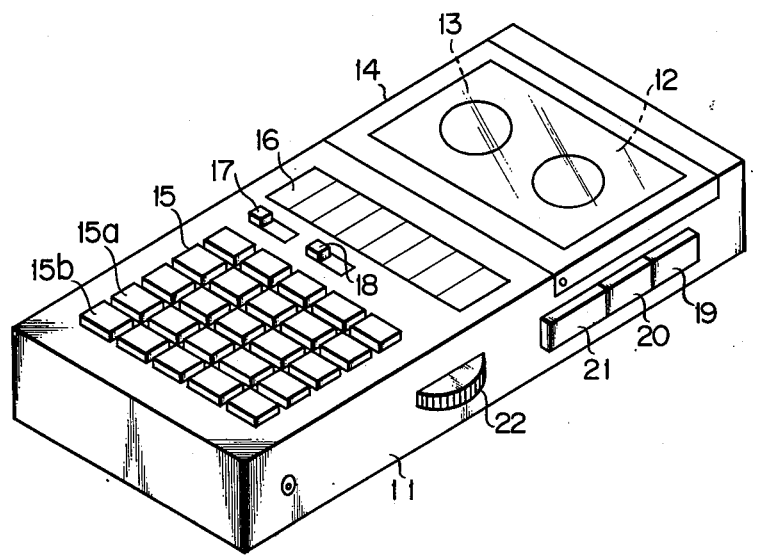
FIG. 1 shows a perspective view of an embodiment of a tape recorder device according to the present invention.

Referring now to FIG. 1, there is shown an external appearance of a tape recorder with desk top calculator. In the figure, a case 11 is provided with a cover 14 for covering a cassette receiving chamber 13. The cover 14 is openably mounted to the case 11. A key board 15 is disposed on the other upper surface of the case 11. A display panel 16 is disposed between the cassette cover 14 and the key board 15 on the upper surface of the case 11. Further, a power switch 17 and a speed change switch 18 are disposed between the display panel 16 and the key board 15. The case 11 also is provided at one of the side walls with a recording button 19, a reproduction button 20, a stop button 21 and a speed adjusting knob 22.

Figure 2:
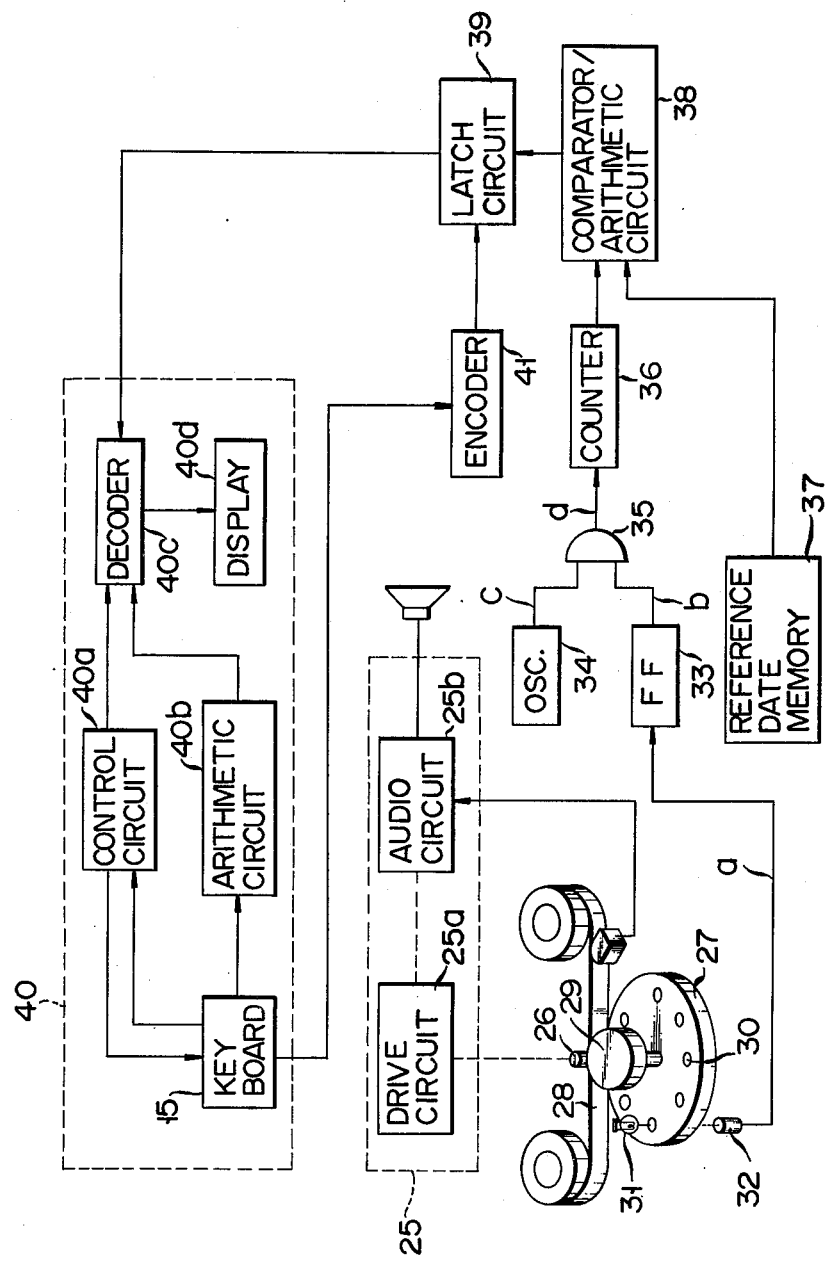
FIG. 2 shows a block diagram of the tape recorder device shown in FIG. 1.

Turning now to FIG. 2, there is shown a block diagram of the tape recorder shown in FIG. 1. In the figure, a tape recorder unit 25 includes a drive circuit 25a including a motor (not shown) and an audio circuit 25b. The drive force of the motor of the drive circuit is transferred to a flywheel 27 directly coupled with a capstan 26. A magnetic tape 28 travels at the same speed as of the rotational speed the capstan 26, i.e. the rotational speed of the flywheel 27, since it is pressed against the capstan 26 by a pinch roller 29. Through holes 30 are formed on the periphery of the flywheel 27 at equal intervals in a circular direction. A light emitting means, for example, lamp 31 and a photoelectronic element (for example, photodiode, phototransistor and solar cell) 32 are disposed facing each other with respect to the hole. The output of the photoelectronic element is connected to a flip-flop circuit 32. The output of the flip-flop 33 and the output of a clock pulse oscillator 34 for generating clock pulses with a given frequency are connected to the inputs of an AND gate 35. The output of the AND gate 35 is connected to a comparator/arithmetic circuit 38 through a counter 36. A reference data memory 37 is directly connected to the comparator/arithmetic counter 38. The output of the arithmetic circuit 38 is connected to a latch circuit 39. The latch circuit 39 is connected to an encoder 41 and then to a key board 15 of a desk top calculator unit 40.

The desk top calculator unit 40 is comprised of the key board 15, a control circuit 40a, a memory/arithmetic circuit 40b, a decoder 40c and a display device 40d, as well known. The decoder 40c of the desk top calculator unit 40 is a BCD to 7-segment decoder and used to convert a binary signal into a display signal of 7-segment. The output of the latch circuit 39 is connected to the BCD to 7-segment decoder 40c.

Figure 3:
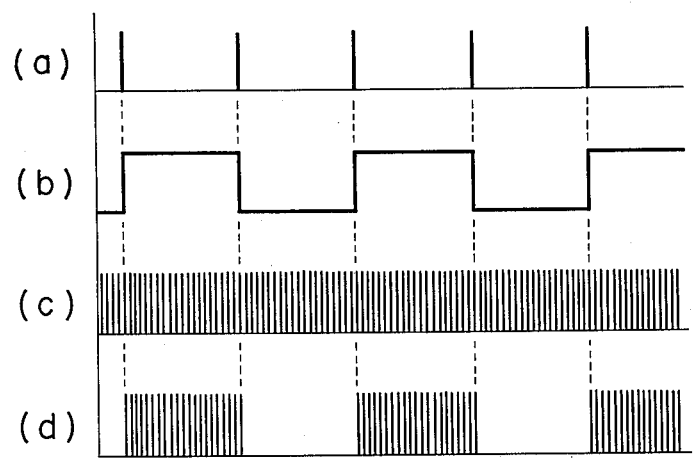
FIG. 3 shows a set of wave forms at the respective portions of the circuit shown in FIG. 1.

In operation, the power switch 17 is turned on and the reproduction button 20 is pushed for reproduction operation of the tape recorder unit 25. Then, the motor of the drive circuit 25a starts to rotate and thus the flywheel 27 rotates. With rotation of the flywheel 27, the lamp 31 intermittently illuminates the photosensitive element 32 through the holes 30 in accordance with the rotational speed of the flywheel 27. Through this operation, the photoelectronic element 32 generates pulses a as shown in FIG. 3 corresponding to the rotational speed of the flywheel 27. Upon receipt of the pulse a, the flip-flop 33 produces pulses b with longer pulse width as shown in FIG. 3. The clock pulse oscillator 34 produces clock pulses c as shown in FIG. 3. The pulses b and c are supplied to the AND gate 35 to produce pulses d as shown in FIG. 3. The pulse trains of the pulse signal d are counted by the counter 36. The pulse number of the pulse trains and the pulse number corresponding to the reference speed from the reference speed data memory 37 are compared in the comparator/arithmetic circuit 38 to produce incremental or decremental speed of the actual speed with respect to the reference speed. For example, $(V2/V1-1)\times 100$ is calculated where V1 is the reference speed and V2 is the actual speed. The result of this is expressed as in the form of +3 or −1, for example. The result of the calculation is latched in the latch circuit 39. Under this condition, a related key, for example, 15a of the key board 15 is depressed to drive the encoder 41. In response to the output signal of the encoder 41, the speed information stored in the latch circuit 39 are read out and fed to the decoder 40c. The speed information from the decoder 40c is converted into 7-segment signals which in turn are supplied to the display device 40d and visualized in the display panel 16 as +3 or −1. Observing this display, an operator adjusts the speed adjusting dial 22 so that the display panel now indicating +3 or −1 indicates 0.

In this example, deviation of the tape travelling speed is displayed; however, when the tape recorder is of the type in which the tape speed of travelling may be stepwisely changed from high to low and vice versa, it is desirable that it can display the high or low of speed. This display is easily realized by loading data corresponding to two speeds, ordinarily 1.2 cm/sec and 2.4 cm/sec, into the latch circuit 39 in FIG. 2. For example, two memories 42 and 43 for storing the 1.2 cm/sec and 2.4 cm/sec data are additionally used and the data stored in these memories are read out in response to a set signal generated by depression of the record button 19 or the reproduction button 20 and the readout data are fed to the latch circuit 39. The latched data of tape speed is read out by an encode signal from the encoder 41 by which a signal generated by pushing a key 15b, for example, is encoded. The speed data corresponding to the 1.2 cm/sec speed data read out from the latch circuit 39 is supplied to the display 40d through the decoder 40c of the desk top unit 40 and then is displayed as 0012 on the display panel 16.

In the case of 2.4 cm/sec of tape speed, a switch 18 is switched to a contact 18b to permit data stored in the memory 43 to be supplied to the latch circuit 39. Finally, the display panel 16 displays 0024.

FIG. 5 shows another embodiment of the circuit for generating data of 1.2 cm/sec and 2.4 cm/sec. In this circuit, memories 42 and 43 are connected to one input terminal of AND gates 46 and 47 and chattering proof circuits 44 and 45 are connected to the other input terminal of the gates 46 and 47, respectively. When the switch 18 is switched to the contact 18a, an output signal from the chattering proof circuit 44 enables to permit speed data stored in the memory 42 to pass therethrough to reach the latch circuit 39. The circuit of the example prevents chattering caused by switching of the switch 18 because of the provision of the chattering proof circuits 44 and 45.

The above-mentioned example is so designed that read-out of data from the latch circuit 39 is performed by depressing the related key 15a or 15b on the key board. However, proper combination of keys for the calculator may be substituted for the specially provided keys 15a and 15b. That is, key data generated when such combined keys are depressed is encoded by the encoder 41 and the encoded signal is used as the address signal for addressing the latch circuit 39. This method reduces the number of keys to be provided.

The speed change for 1.2 cm/sec and 2.4 cm/sec is made by directly switching the switch 18. In place of this, the speed change may be made through a switch mechanism 50 by using a switch lug 12a of the cassette 12, as shown in FIG. 6A and 6B. For example, the cassette 12 is so designed that the cassette with switch lug 12a is operable at 2.4 cm/sec and without the lug 12a is operable at 1.2 cm/sec. In this case, the 2.4 cm/sec cassette is accommodated in the cassette receiving chamber 13 and the tip of a detector level 50a contacts the lug 12a as shown in FIG. 6A to open the switch 50c with the rear end of the lever. On the other hand, the cassette without the lug, i.e. whose lug is removed, is housed in the cassette receiving chamber 13. In this case, the tip of the detector lever 50a enters into a depression 12b of the cassette 12 and the rear end of the lever 50a closes the switch 50b. In this manner, the tape travelling speed is automatically changed between 1.2 cm/sec and 2.4 cm/sec, through switching of the switches 50b and 50c.

When this apparatus is desired to be operated as a calculator, it may be operable by an ordinary manner. In this case, it is not always necessary to stop the tape recorder unit.

In the above-mentioned embodiment the data of the tape travelling speed are obtained by using exclusively a circuitry comprising the flip-flop 33, the clock pulse oscillator 34, the AND gate 35, the counter 36, the comparator/arithmetic circuit 38, the latch circuit 39, the encoder 41 and memories 42 and 43. This circuitry may be fabricated in a single chip, together with the circuit of the desk top calculator. If the circuit of the desk top calculator may be used for this purpose, it may be applied to the circuit for obtaining the tape speed data.

When the tape recorder is not provided with the desk top calculator, if the display device and its related decoder are used, the tape travelling speed and the speed deviation may be displayed. An example with such the function will be illustrated in block form in FIG. 7. If an operation switch 51 is actuated, a decoder 41 produces an address signal for a latch circuit 39. The data read out from the latch circuit 39 is supplied to a display device 52 through a decoder 53 to be displayed by the display device. Details of the circuit will be omitted because it is the same as that of FIG. 2 except for the circuit relating to the desk top calculator in FIG. 2.

The tape speed is detected through cooperation of a lamp, a photoelectronic element, and holes of the flywheel, in the example mentioned above. Alternately, one or more contacts mounted on the periphery of the flywheel at equal intervals and a reed switch or a magnetic head is disposed close to the periphery of the flywheel, and the tape running speed pulses are produced through the switching operation of the reed switch or the magnetic head. Light emission diodes, liquid crystal devices, or Nixie tubes may be used for the display panel of the display device.

What we claim is:
1. A tape recorder comprising:
   a desk top calculator unit including a key board having a plurality of keys, an arithmetic circuit, a control circuit and a display device;
   a tape recorder unit which includes a drive circuit and an audio circuit and performs record and reproduction to and from a magnetic tape travelling at a given speed;
   a tape speed detector which detects travelling speed of the magnetic tape to produce an electrical signal corresponding to the travelling speed of tape;

means which calculates actual tape speed on the basis of the electrical signal from said speed detector to produce actual speed data;

a reference speed data memory for storing reference speed data corresponding to reference travelling speed of tape; and arithmetic means to which the reference speed data from said reference speed data memory and the actual speed data from said actual speed data generating means are supplied to calculate deviation of the actual speed from said reference speed thereby to obtain deviation data;

wherein deviation data corresponding to said deviation obtained from said arithmetic means is applied to the display device of said desk top calculator, and said deviation is digitally displayed by the display device.

2. A tape recorder according to claim 1, in which said speed detector generates pulse signal with pulse intervals corresponding to the tape travelling speed; and said actual speed data generating means comprises a clock pulse oscillator for generating clock pulses with a given frequency, a flip-flop circuit responsive to the pulse signal from said speed detector, a gate circuit to which clock pulses from said clock pulse oscillator and the pulse signal from said flip-flop circuit are supplied to permit clock pulses corresponding to the pulse width of the pulse signal from said flip-flop circuit to pass therethrough, and a counter for counting clock pulses from said gate circuit.

3. A tape recorder according to claim 1, in which said tape recorder unit includes a capstan and a flywheel which is coupled with said capstan and includes a plurality of through holes disposed on the periphery of the flywheel at equal intervals; and said speed detector includes a light emitting means and a photoelectronic element which are disposed facing each other with respect to one of said through holes.

4. A tape recorder according to claim 1 in which a latch circuit is connected between said arithmetic means and the display device of said desk top calculator for latching output data from said arithmetic means in said latch circuit, the data being read out from said latch circuit in response to actuation of at least one related key included in the key board of said desk top calculator to be displayed by the display device of said desk top calculator.

5. A tape recorder according to claim 1, further including additional memory means for storing speed data corresponding to at least two predetermined tape running speed; and a latch circuit for latching said speed data stored in said additional memory means and deviation data from said arithmetic means, said latch circuit being addressed by a signal generated when at least one related key of the key board of said desk top calculator is actuated, to output selectively said speed data and said deviation data latched therein to display device of said desk top calculator.

6. A tape recorder according to claim 1 which further includes an additional memory means for storing a plurality of predetermined tape speed data corresponding to a plurality of tape running speeds, readout means for reading out selectively one of the tape speed data from said additional memory, and a latch circuit for latching the data from said readout means and transferring the data to said display device of said desk top calculator in response to the operation of at least one related key of said key board.

7. A tape recorder according to claim 6, wherein said readout means comprises a switch circuit for transferring selectively one of said tape speed data to said latch circuit.

8. A tape recorder according to claim 6, wherein said readout means comprises a plurality of gate circuits supplied with the tape speed data, respectively, and a switch circuit for selecting one of said gate circuits to transfer the respective tape speed data through the selected gate circuit to said latch circuit.

9. A tape recorder according to claim 8, wherein said switch circuit includes a switch means and a plurality of chattering proof circuits connected between said switch and said gate circuits, respectively.

10. A tape recorder according to claim 9, wherein, for a tape recorder for receiving a tape cassette having a depression, said switch means comprises a lever moving in a first direction associated with the depression of the cassette and a switch actuated by said lever.

11. A tape recorder according to claim 9, wherein for a tape recorder for receiving a tape cassette having a lug covering a depression in said cassette, said switch means comprises a lever moving in a direction associated with the lug, and a switch actuated by said lever.

* * * * *